J. P. DURKIN.
HANDLE.
APPLICATION FILED APR. 14, 1908.

928,950.

Patented July 27, 1909.

WITNESSES:

INVENTOR
John P. Durkin
BY
Charles N. Butler
ATTORNEY

UNITED STATES PATENT OFFICE.

JOHN P. DURKIN, OF PHILADELPHIA, PENNSYLVANIA.

HANDLE.

No. 928,950.     Specification of Letters Patent.     Patented July 27, 1909.

Application filed April 14, 1908. Serial No. 426,960.

*To all whom it may concern:*

Be it known that I, JOHN P. DURKIN, a citizen of the United States, residing in the city of Philadelphia, county of Philadelphia, and State of Pennsylvania, have invented an Improved Handle.

The handle of my invention is designed for fitting and turning a shaft or hub, and to this end it has means for varying the size of its socket to secure a close fit or tight engagement. The imperfect fit and wear of usual constructions are annoying and injurious. My improvements permit all lost motion to be taken up so as to avoid the striking action that takes place in turning a handle loose on a shaft, permits the adjustment of the socket so that it will make a close fit with shafts of various sizes, and provides ready means for clamping the handle to the shaft.

Figure 1:
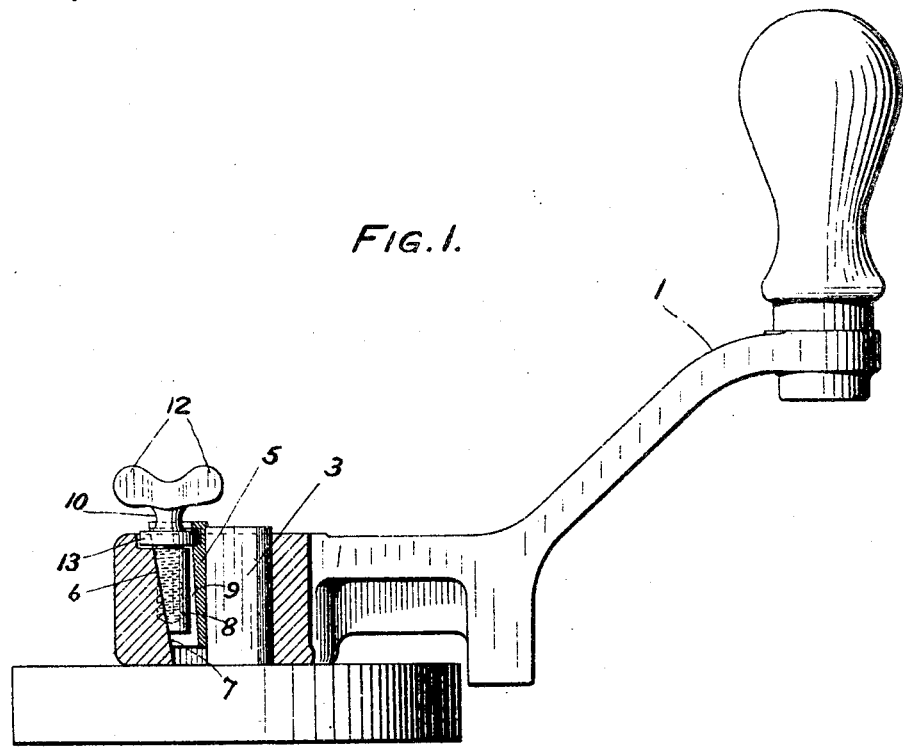
Figure 2:
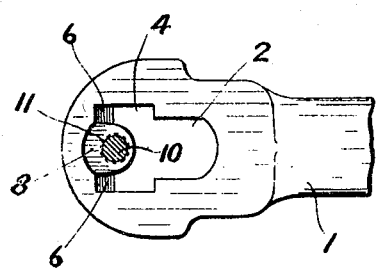
Figure 3:
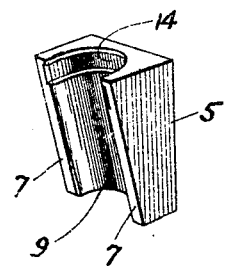

In the accompanying drawings, Figure 1 is a sectional elevation of a handle embodying the invention applied to a shaft; Fig. 2 is a plan view of a section of a handle embodying the invention; and Fig. 3 is a perspective view of a wedge used in the invention.

As illustrated in the drawings, the invention is embodied in a handle 1 containing a downwardly tapering socket comprising the part 2 for receiving the end of the shaft 3 and the part 4 for receiving the wedge 5, inclined surfaces 6 at the rear of the socket engaging like surfaces 7 of the wedge.

A hub 8 is formed in the handle, lies between the surfaces 6 and projects into the socket part 4, the wedge 5 having the concavity 9 within which the hub lies. A screw 10 runs in a threaded hole 11 formed in the hub, is provided with the wings 12 for turning it and has a ring or circular flange 13 which engages a curved groove 14 forming a yoke within the concave surface of the wedge. By revolving the screw, it moves longitudinally while its flange revolves in the groove in the wedge, the latter being lowered or elevated thereby to tighten, fasten or release the handle on the shaft.

Having described my invention, I claim:

1. A handle having a socket with an inclined surface, within said socket a wedge having an inclined surface engaging said inclined surface first named to guide and hold said wedge in various positions in said socket, and a screw adapted for adjusting the position of said wedge.

2. A handle having a socket, a hub extending into said socket, a wedge movable within said socket, and a screw engaging said hub and wedge, said screw adjusting and holding said wedge.

3. A handle having a socket with inclined surfaces, a projection having a threaded hole between said surfaces, a screw movable in said hole and having a flange, and a wedge having inclined surfaces engaging said inclined surfaces first named, a recess for receiving said projection, and means for engaging the flange of said screw.

4. A handle having a socket with an inclined surface, a wedge having an inclined surface engaging and movable along the inclined surface of said socket, one of said parts having a yoke and the other a threaded hole, and a screw engaging said hole, said screw having a flange engaging said yoke.

In witness whereof I have hereunto set my name this 6th day of April, 1908, in the presence of the subscribing witnesses.

JOHN P. DURKIN.

Witnesses:
    ROBERT JAMES EARLEY,
    JOS. G. DENNY, Jr.